United States Patent [19]

Wendt

[11] 4,339,058
[45] Jul. 13, 1982

[54] APPARATUS FOR DISPENSING MATERIAL FROM A CONTAINMENT VESSEL IN PRESELECTED MEASURED AMOUNTS

[76] Inventor: Robert J. Wendt, 743 E. Military, Fremont, Nebr. 68025

[21] Appl. No.: 101,211

[22] Filed: Dec. 7, 1979

[51] Int. Cl.$^3$ ............................................. G01F 11/06
[52] U.S. Cl. ................................. 222/309; 128/236; 222/326; 222/391; 222/473
[58] Field of Search .............. 222/309, 324, 325, 326, 222/327, 391, 472, 473, 474; 128/218 C, 218 PA, 234, 236

[56] References Cited

U.S. PATENT DOCUMENTS

| | | | |
|---|---|---|---|
| 2,229,839 | 1/1941 | Crewe | 222/391 X |
| 2,233,587 | 3/1941 | Crewe | 222/391 X |
| 2,646,906 | 7/1953 | Jones et al. | 222/327 X |
| 2,732,102 | 1/1956 | Ekins | 222/391 X |
| 3,029,653 | 4/1962 | Nilsson | 222/391 X |
| 3,758,005 | 9/1973 | Christine et al. | 222/309 |
| 3,894,663 | 7/1975 | Carhart et al. | 222/309 |
| 4,090,639 | 5/1978 | Campbell et al. | 222/326 X |

Primary Examiner—Gil Weidenfeld
Assistant Examiner—Fred A. Silverberg
Attorney, Agent, or Firm—William D. West

[57] ABSTRACT

An apparatus for dispensing material in measured amounts, primarily for use in the treatment of livestock is disclosed. The apparatus provides a material containment cylinder having a nozzle at one end and a diaphragm attached to a rod at the other end and a mechanism for precisely controlling the movement of the diaphragm so that precise dosages are dispensed through the nozzle end. A bayonet locking attachment for affixing the material containment cylinder to the diaphragm movement mechanism is also disclosed. A number of embodiments are provided for precisely controlling the diaphragm movement mechanism including a slideable rod friction attachment and ratchet and stop mechanisms.

8 Claims, 11 Drawing Figures

APPARATUS FOR DISPENSING MATERIAL FROM A CONTAINMENT VESSEL IN PRESELECTED MEASURED AMOUNTS

BACKGROUND OF THE INVENTION

A. Field of the Invention

This invention relates generally to devices for the dispensing of material in measured amounts, and in particular for the controlled dosage of livestock.

B. Background of the Invention

The controlled dispensing of material has been necessary in a number of fields, including the dispensing of animal health care products, adhesives, paints, food and any place that it is necessary that measured amounts of material are dispensed.

One sure method of measuring the amount of dispensed material is to measure each independent dose. Unfortunately, the measurement of each independent dose is time-consuming and since many materials which are to be dispensed display significant adhesive qualities, there is great waste in individually measuring each dose. The material adheres to the measuring recepticle and great amounts of material are lost.

It has been known for some time that material can be dispensed in a tube in which a nozzle is provided at one end, so that the material is squeezed or moved along the tube and dispensed through the nozzle. It can also be shown that if a diaphram is inserted in one end of the tube and pressed against the material that an amount is dispensed out the nozzle in relation to the distance that the diaphram is moved along the tube. If the tube is calibrated, the amount of material dispensed can be easily viewed.

It has been shown in the dispensing of materials such as caulking compounds, that a rod attached to a diaphram may be advanced along the tube by a ratchet mechanism as long as constant pressure is applied to a lever arm advancing the rod. If, for example, in the treatment of an animal health care problem, such as scowers in baby pigs, the medicine is placed in a tube and the diaphram is moved along at a pre-determined distance, the dosage of the medicine will be constant for each baby pig. Unfortunately, it is necessary to view the diaphram movement before and after each application. Conventional caulking guns and devices which dispense material in this fashion do not have a means for pre-selecting the movement of rod and diaphram travel.

Accordingly, a need exists for such an improvement in dispensing devices, so that the amount of material dispensed is uniform and constant for each application; that the dispensing of the material is accomplished without an individual pre-determined measurement for each single dose; that the tube or vessel holding the material does not have to be viewed for each independent dose, but rather that each single application can be accomplished with a single movement, and yet the dosages are constant and uniform. Also, there exists a need for a means for varying the amount of the dose to be established with each movement. The instant invention is directed toward that need.

SUMMARY OF THE INVENTION

An object of the invention is to provide a material dispensing apparatus in which material may be dispensed in controlled amounts.

Another object of the invention is to provide a material dispensing apparatus in which a single movement of the operator allows the dispensing of a precise pre-determined amount of material.

Another object of the invention is to provide a material dispensing apparatus which, once the amount of material to be dispensed is determined, that for each single movement of the operator, a uniform amount of material is dispensed.

Another object of the invention is to provide for a gun-type dispensing apparatus.

Another object of the invention is to provide for a gun-type treatment apparatus for the treatment of livestock, in which a pre-determined amount of material is dispensed with each dose.

A further object of the invention is to provide a material dispensing apparatus for the treatment of livestock of a gun type, having a diaphram and rod and a tube and a dispensing mechanism allowing a pre-determined limit to the rod movement.

A further object of the invention is to provide for a livestock treatment gun having a non-slip ratchet, and a trigger mechanism for advancing the material out of the nozzle of the treatment gun.

BRIEF DESCRIPTION OF THE DRAWINGS

The advantages of this invention will become apparent upon consideration of the following detailed disclosure of the invention, especially when taken in conjunction with the accompanying drawings wherein.

DESCRIPTION OF THE PREFERRED EMBODIMENT

Figure 1:
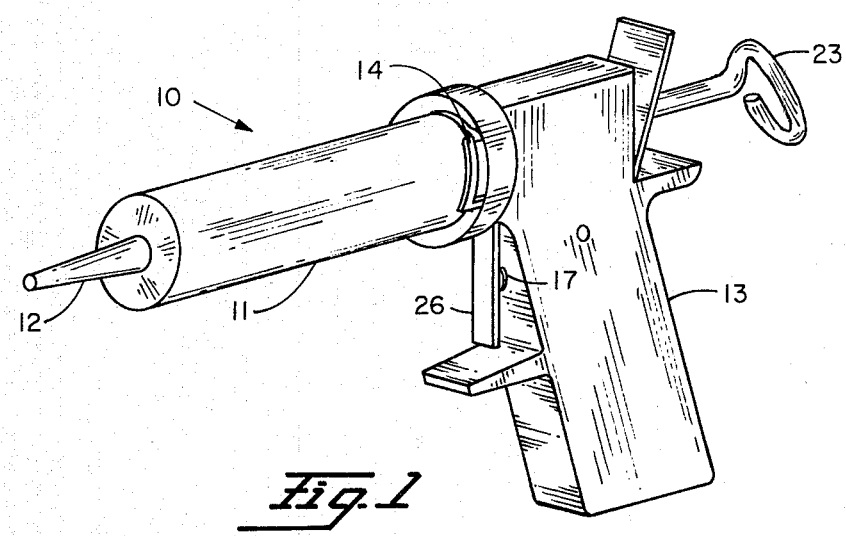
FIG. 1 is a perspective view of the instant invention.
Figure 2:
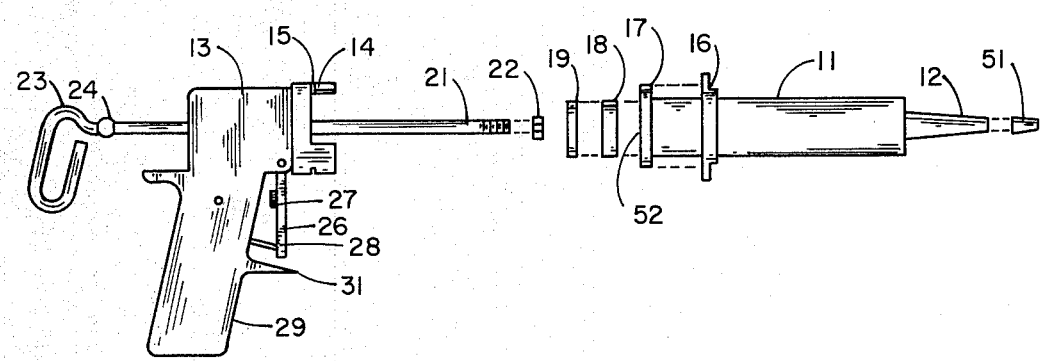
FIG. 2 is an exploded right-side elevational view of the invention.
Figure 3:
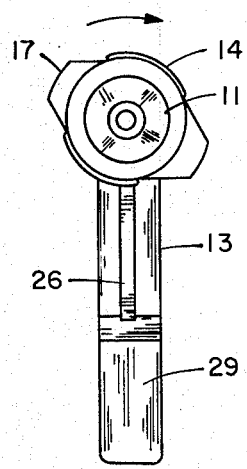
FIG. 3 is a front view of the invention wherein the dispensing tube is shown in an unlocked position and the arrow indicates the position of movement necessary to lock the dispensing tube onto the dispensing mechanism.
Figure 4:
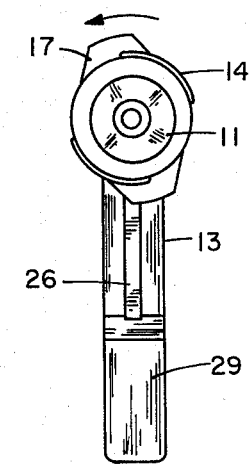
FIG. 4 is also a front view of the instant invention, showing the dispensing tube in locked position and the arrow indicates the direction of movement necessary to unlock the dispensing tube.

The apparatus 10 is shown generally in FIG. 1 and in expanded detail in FIG. 2. The apparatus provides a material containment vessel 11 which has a nozzle 12 and is generally cylindrical in shape, thereby forming a dispensing tube. As can be shown in FIG. 2, vessel 11 is also attached to housing 13 by the use of a bayonet-type fitting 14 having slots 15 which co-act with annular attachment ears 16. Ears 16 slip over vessel 11 and lock against flange 17 to co-act with bayonet attachment 14. The locking of flange 17 to fitting 14 is shown in FIG. 3 in which flange 17 is rotated to co-act with bayonet fitting 14. The unlocking procedure is shown in FIG. 4.

Referring once again to FIG. 2, where it is shown that circular disc diaphram 18 is attached to circular flat washer 19, both of which diaphram 18 and washer 19 are attached to rod 21 by the use of nut 22 to provide a diaphram rod plunger assembly which is contained within vessel 11. Rod 21 is provided with a handle 23 having a platen stop 24 and rod 21 is inserted within housing 13. Actuation lever 26 can be seen in both FIGS. 1 and 2 as well as limiting stops 27 and operating rod 28. Handle grip 29 is also attached to housing 13.

Figure 5:
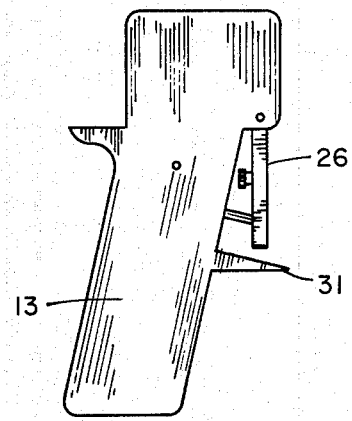
FIG. 5 is a right-side elevational view of one embodiment of the handle of the invention.
Figure 6:
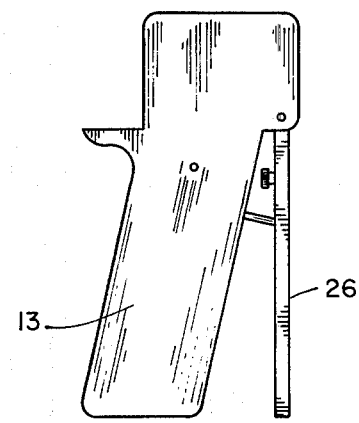
FIG. 6 is a right-side elevational view of a yet still different embodiment of the instant invention.

FIG. 5 illustrates one embodiment in which housing 13 is provided with hand rest 31 and shortened actuation lever 26. FIG. 6 illustrates housing 13 in another embodiment without hand rest 31. Also, actuation lever 26 is of a greater length to provide for increased leverage in operating the mechanism.

Figure 7:
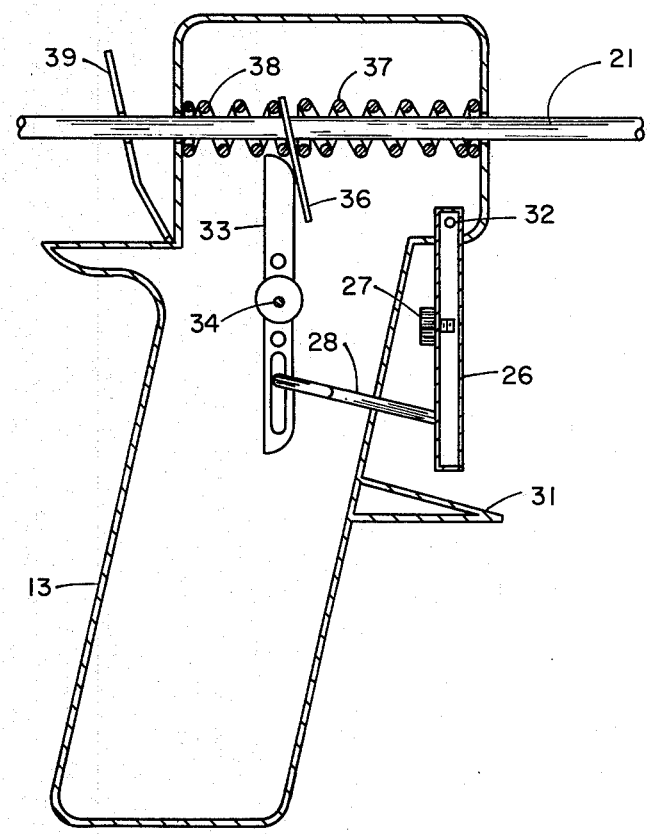
FIG. 7 is a cross-sectional view detail of the handle of the embodiment as shown in FIG. 5.

Referring now to FIG. 7, where the operating mechanism is disclosed, it can be seen that rod 21 is contained within housing 13. Actuation lever 26 is pivotally attached to housing 13 by the use of a pin pivot 32. An elongate lever arm 28 is attached to lever 26 and slideably attached to another elongate lever arm 33 which is, in turn, attached to housing 13 by bushing 34. Lever arm 33 engages a slideable member 36 in which rod 21 is inserted. Springs 37 and 38 are provided to bias member 36. Slideable member 39 is provided outside of housing 13 to stop rod 21 from exceeding the limits as press stop 24 will engage slideable member 39 prior to pushing the diaphram 18 through the end of vessel 11.

Figure 8:
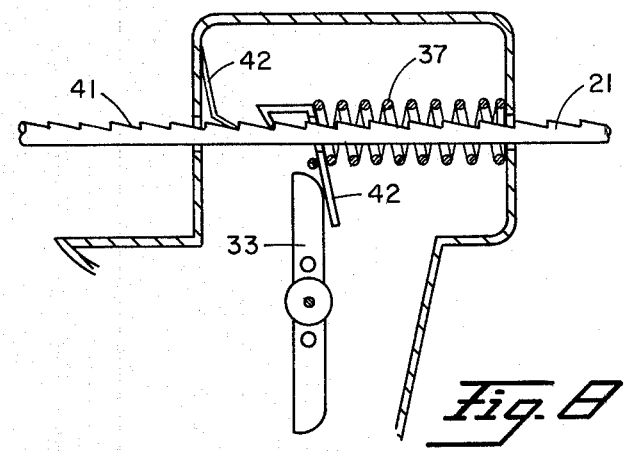
FIG. 8 is a detail of another embodiment of the movement mechanism.

As can be shown in FIG. 8, in yet another embodiment, rod 21 is provided with a series of ratchets 41 along the top surface of rod 21 and limiting stop 42 is provided to engage ratchets 41 as rod 21 is advanced by member 33. Member 33 acts against member 42 and spring biasing means 37.

Figure 9:
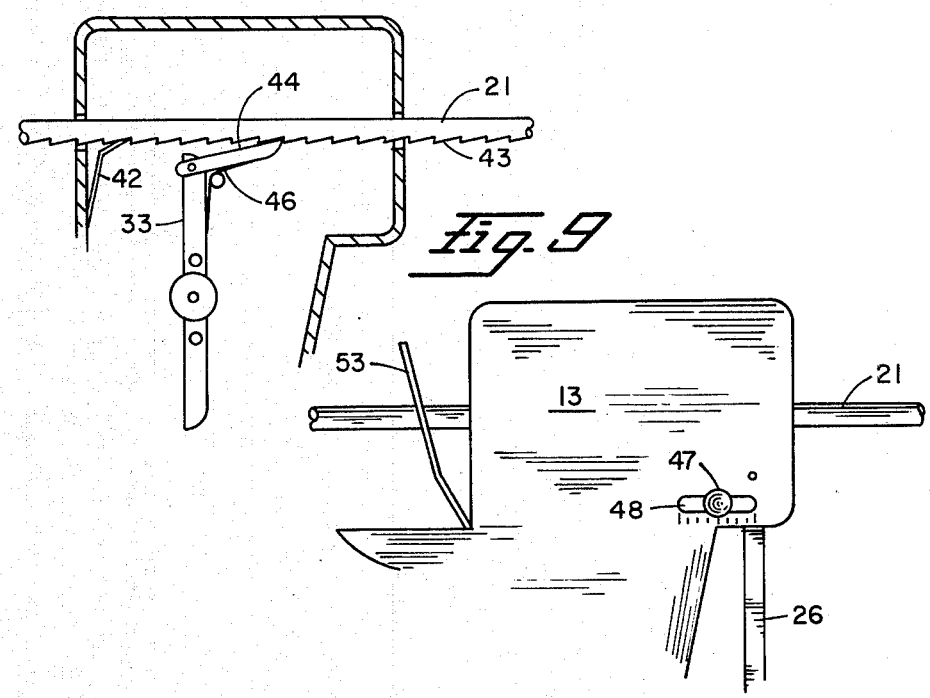
FIG. 9 is a detail of a still another embodiment of the movement mechanism.

Another embodiment is shown in FIG. 9 in which ratchets 43 are provided on the lower surface of rod 21. Limiting stop 42 is also provided to co-act with ratchets 43 as rod 21 is advanced. Limiting stop 42 co-acts as a pawl with ratchets 43 to prevent rearward movement of rod 21. As in the previous embodiment as shown in FIG. 9, member 33 is pivotally attached to member 44 which engages ratchets 43 along rod 21 and is urged against ratchets 43 on rod 21 by spring biasing 46.

Figure 10:
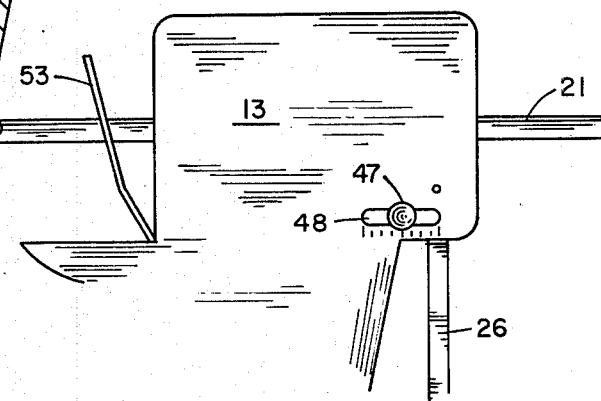
FIG. 10 is a detail right-side elevational view of the movement mechanism.

In order to limit the travel of the actuation lever 26, and thus, limit the travel of rod 21, various stop mechanisms are employed in the instant invention. One such stop mechanism is shown in FIG. 10 in which knurled knob 47 is provided in an elongate slot 48 in housing 13. The adjustment of knurled knob 47 limits the travel of actuation lever 26 so that rod 21 is only advanced according to a preset distance.

Figure 11:
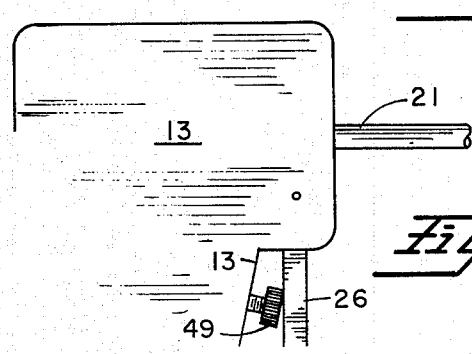
FIG. 11 is a right-side elevational detail view showing the position of the limiting stop in the handle housing rather than on the trigger as shown in FIGS. 5, 6 and 7.

In FIG. 11, the limiting function is provided by knurled knob 49 located in housing 13 which stops actuation lever 26 at a predetermined setting. Stop means to limit the movement of rod 21 may also be attached to member 33.

The operation and use of apparatus 10 will now be disclosed. A material to be dispensed, such as livestock treatment medicine, is placed within containment vessel 11. The vessel 11 may be prepackaged with a seal 51 on the nozzle end as shown in FIG. 2 and also a seal (not shown) at diaphram end 52. Washer 19, diaphram 18 and nut 22 are secured to rod 21 to provide a plunger diaphram assembly. When the vessel containing the material to be dispensed is attached to housing 13 by use of bayonet fitting 14 and flanges 16, rod 21 is pulled through housing 13 away from vessel 11 by use of handle 23 and is held in position by rod stops 53 in FIG. 10, 42 in FIG. 8, 42 in FIG. 9, or 39 in FIG. 7.

As shown in FIG. 3, tube 11 is then rotated so that flange 17 co-acts with slot 15 in bayonet fitting 14 to tightly seal tube 11 to housing 13. Adjustment knob 27 or 49 or 47 is appropriately adjusted to provide for an incremental dosage. When actuation lever 26 is urged toward housing 13, activating arm 28 as shown in FIG. 7, co-acts with operating arm 33 to pivot arm 33 to urge member 36 in frictional engagement against rod 21 to advance rod 21 until actuation lever 26 stops against knob 27, 47 or 49. Rod 21's movement advances diaphram 18 against the material contained in housing 11 and a predetermined amount of material is forced out nozzle 12. Each successive movement of actuation lever 26 toward housing 13 dispenses a like amount of material from nozzle 12, depending upon the setting of the stop 27, 47 or 49.

When treating livestock with the apparatus 10, it can readily be seen that one particular setting of the stop mechanism is all that is required and one may treat each successive animal by merely placing the nozzle 12 in the animal's mouth and squeezing lever 26. It is also contemplated that containment housing 11 and nozzle 12 could be altered to provide for a hypodermic needle to allow for injections of livestock using the same apparatus. As can be readily seen, the use of apparatus 10 thus greatly facilitates the treatment of livestock and its general applicability for the dispensing of any material in precise amounts is readily apparent.

Although specific components and steps have been stated in the above description of the preferred embodiments of the invention, other suitable materials, and process steps, as listed herein, may be used with satisfactory results with varying degrees of quality. In addition, it will be understood that various other changes of the details, materials, steps, arrangements of parts, and uses which have been herein described and illustrated in order to explain the nature of the invention will occur to and may be made by those skilled in the art, upon the reading of this disclosure. Such changes are intended to be included within the principles and scope of this invention as claimed.

I claim:

1. An apparatus for dispensing materials in measured amounts comprising:
   (a) a material containment vessel having a nozzle;
   (b) a rod having a first end and a second end wherein a diaphram is attached at said first end of said rod and is operably inserted into said containment vessel distal said nozzle;
   (c) movement means for advancing said rod and diaphram in said containment vessel and operably attached to said rod wherein said movement means comprises a first pivot arm, a second pivot arm having a first end located adjacent to but spaced from said rod and a second opposite end, and a slideable rod engagement wherein said first pivot arm is operably connected to said first end of said second pivot arm, and said slideable rod engagement is directly connected to said second end of said second pivot arm and a handle means and wherein said movement means further comprises a ratchet and pawl;

(d) housing means attached to said movement means wherein said handle means is attached to said housing means;
(e) attachment means for attaching said containment vessel to said housing means;
(f) stop means for limiting the amount of travel of said movement means, said stop means operably attached to said movement means; and
(g) spring biasing means for biasing said movement means, said spring biasing means operably attached to said movement means;
(h) an elongate member including said pawl being directly and operably attached to the first end of said second pivot arm and slideably attached to said rod.

2. A device for dispensing material in measured amounts as described in claim 1, wherein said ratchet and pawl operate on the side of the rod nearest the first pivot arm.

3. A device for dispensing material in measured amounts as described in claim 1 wherein said ratchet and pawl is located on the side of the rod opposite said first pivot arm.

4. A device for dispensing material in measured amounts as described in claim 1, wherein said stop means is attached to said first pivot arm.

5. A device for dispensing material in measured amounts as described in claim 1, wherein said stop means is located on the handle.

6. A device for dispensing material in measured amounts as described in claim 1, wherein said attachment means comprises a bayonet-type fitting.

7. A device for dispensing material in measured amounts as described in claim 6, wherein said first pivot arm is of a length less than the length of said handle means.

8. A device for dispensing material in measured amounts as described in claim 6 wherein said first pivot arm is of a length at least as long as the length of said handle means.

* * * * *